United States Patent
Cooley

(10) Patent No.: US 11,772,484 B2
(45) Date of Patent: Oct. 3, 2023

(54) FULLY-INTEGRATED, FLUID FLOW-CONTROL MODULE DESIGNED FOR INSTALLATION WITHIN AN ISO FILLER NECK OF A TOP-FILL DEF TANK

(71) Applicant: Robert Charles Cooley, Springville, UT (US)

(72) Inventor: Robert Charles Cooley, Springville, UT (US)

( * ) Notice: Subject to any disclaimer, the term of this patent is extended or adjusted under 35 U.S.C. 154(b) by 112 days.

(21) Appl. No.: 17/611,908

(22) PCT Filed: May 18, 2020

(86) PCT No.: PCT/US2020/033499
§ 371 (c)(1),
(2) Date: Nov. 16, 2021

(87) PCT Pub. No.: WO2020/232453
PCT Pub. Date: Nov. 19, 2020

(65) Prior Publication Data
US 2022/0227223 A1 Jul. 21, 2022

Related U.S. Application Data

(60) Provisional application No. 62/848,684, filed on May 16, 2019.

(51) Int. Cl.
*B60K 15/04* (2006.01)
*B60K 15/035* (2006.01)
*G05D 9/04* (2006.01)
*B60K 15/03* (2006.01)

(52) U.S. Cl.
CPC .......... *B60K 15/0406* (2013.01); *G05D 9/04* (2013.01); *B60K 2015/03289* (2013.01); *B60K 2015/03552* (2013.01); *B60K 2015/0477* (2013.01); *B60K 2015/0483* (2013.01)

(58) Field of Classification Search
CPC ...... B60K 15/0406; B60K 2015/03552; B60K 2015/0483; B60K 2015/0477; G05D 9/04
See application file for complete search history.

(56) References Cited

U.S. PATENT DOCUMENTS 6,311,723 B1 11/2001 Shipp et al.
9,983,598 B2 * 5/2018 Cooley ................. B60K 15/04

* cited by examiner

*Primary Examiner* — Jason K Niesz
(74) *Attorney, Agent, or Firm* — Angus C. Fox, III

(57) ABSTRACT

A fully-integrated flow-control module is designed to fit within a filler neck of a DEF tank that conforms to ISO (International Organization for Standardization) Standard 22241-4:2009(E). The flow-control module includes a breather cap that locks the flow-control module within the mouth of the ISO filler neck. A spring-biased valve piston, which is controlled by a bleed path within a bleed and float body, opens and closes to control fluid flow into the DEF tank. A fluid level float is mounted on a control rod. The control rod and a bleed valve poppet are rigidly secured to a connector beam. When fluid levels in the tank raise the float, the bleed valve poppet seals a bleed circuit escape port, thereby enabling the valve piston to close, increase fluid pressure at the nozzle, and cause the nozzle to shut off.

20 Claims, 13 Drawing Sheets

FULLY-INTEGRATED, FLUID FLOW-CONTROL MODULE DESIGNED FOR INSTALLATION WITHIN AN ISO FILLER NECK OF A TOP-FILL DEF TANK

RELATED APPLICATION DATA

This is a National Stage Application, under 35 U.S.C. § 371, of International Application No. PCT/2020/033499, filed on May 18, 2020, and which claims benefit of U.S. Provisional Application No. 62/848,684, filed on May 16, 2019.

BACKGROUND OF THE INVENTION

Field of the Invention

This invention relates, generally, to flow control valve assemblies that are used to protect tanks from being over-filled with fluid. More specifically, this invention relates to ultra-compact pressureless flow-control modules designed for installation within the ISO filler neck of a diesel exhaust fluid supply tank.

Description of the Prior Art

For many years large machinery fitted with fuel tanks have been equipped with rapid-fill fueling systems to enable rapid filing of large capacity fuel tanks. The existing zfast fill fuel systems rely on an air vent that prevents air from escaping the fuel tank when the required level of fuel has been attained. This causes pressure in the fuel tank to increase to a level that automatic shuts-off a fuel supply nozzle.

A major concern of this system is that when the fuel level activates the shut-off for the fuel supply nozzle, the shut-off can be overridden and fuel can continue to be forced into the fuel tank above the normal level. This can cause the fuel tank to rupture from the high pressure attained when filling.

U.S. Pat. No. 6,311,723 B1 to David Shipp and Robert Turner, has addressed this problem by devising a flow control valve assembly that prevents the build up of pressure within the fuel tank during and after filing. The flow control valve assembly also prevents the supply fuel nozzle from being overridden thus preventing the possibility of overfilling. U.S. Pat. No. 6,311,723 is hereby incorporated by reference.

The control valve assembly of U.S. Pat. No. 6,311,723 uses float valve to determine when the level of fuel in the fuel tank is at a desired level. When the desired level of fuel has been attained, the float valve is used to block the flow of fuel through a bleed pipe to stop the flow of fuel through a control valve. An open breather is provided within the fuel tank to allow gas to escape from the fuel tank during filling to prevent the fuel tank rupturing.

Another problem associated with prior-art flow control valves is that they are typically used in bottom-filled tanks. This requires that the float assembly be located inside the tank near the top thereof, while the flow control valve is located near the bottom of the tank near where the fuel nozzle couples to the receiver. In order for the float assembly to control the flow control valve, a small-diameter bleed line is used to couple the flow control valve assembly—that is near the bottom of the tank—to the float assembly that is near the top of the tank. The bleed line can be routed either internal or external to the tank, depending on the design of the unit. The use of such a two-piece assembly precludes the use of such a device in smaller tanks.

What was needed is a fully-integrated flow control assembly that mounts at the top of the fuel tank. In such a fully-integrated unit, the float assembly and the flow control valve assembly are both installed within the tank near the top thereof. Only an inlet/vent head protrudes from the top of the tank. Installing the fully-integrated assembly is much simpler than installing the separate float and control valve assemblies, as there is no need to make a connection between the two devices.

The aforementioned problems were solved, as evidenced by the issuance of U.S. Pat. No. 9,983,598, to Robert Charles Cooley (inventor of the present application), titled FULLY-INTEGRATED FLOW-CONTROL VALVE ASSEMBLY FOR TOP-FILLED FUEL TANKS. This flow-control valve, which is designed for internal mounting near the top of a fuel tank, is suitable for use with liquids, such as petroleum fuels, that do not freeze.

The International Organization for Standardization (ISO) is a non-governmental international entity based in Geneva, Switzerland having a membership comprising national standards organization from 162 nations. The ISO has published over 22309 International Standards covering almost myriad aspects of technology and manufacturing.

What is needed is a fully-integrated, flow-control valve assembly for top-filled tanks that will switch between on and off states even when the fuel inlet is supplied with fuel under pressure.

SUMMARY OF THE INVENTION

This invention provides a fully-integrated flow-control module for top-fill diesel exhaust fluid (DEF) tanks. The module is designed to fit within a filler neck of a DEF tank that conforms to ISO (International Organization for Standardization) Standard 22241-4:2009(E). The flow-control module includes a breather cap that locks the flow-control module to an adapter cap that is secured to the mouth of the ISO filler neck. A breather assembly, which allows bi-directional flow of air in an out of the tank in which the flow-control module is installed, is installed in the side of the breather cap. The breather cap screws onto the externally-threaded top of a retainer bushing. A receiver socket screws into the top of the retainer bushing, which is also threaded internally. A receiver fitting screws into the receiver socket. The retainer bushing screws onto an upper portion of a pipe nipple that has a center flange with opposed flat spots that can be engaged by a spanner wrench. The top of a main valve body screws onto a bottom portion of the pipe nipple. A spring-biased valve piston, which is controlled by a bleed path within a bleed and float body, opens and closes to control fluid flow into the DEF tank. A fluid level float is mounted on a control rod. A threaded nut retains the float on the control rod. Both the float and the control rod move up and down in response to fluid levels within the DEF tank.

The valve piston incorporates a pair of O-ring seals, one of which is installed near the piston crown to prevent fluid from leaking around the piston when it is in the closed position. The other O-ring seal, which is installed on the piston skirt, prevents fluid from leaking around the piston skirt so that DEF fluid can enter the bleed circuit only through a bleed aperture in the center of the piston crown. Until fluid level in the DEF tank has reached the level of the fluid level float, DEF fluid can enter the bleed circuit through the bleed aperture. As long as DEF bleed fluid can pass through the bleed aperture, the biasing spring beneath the valve piston provides a biasing force that is insufficient to raise the valve piston to its closed position. Bleed fluid enters a biasing spring chamber beneath the piston crown. A partition, which provides a floor for the biasing spring chamber, allows bleed fluid to escape from the spring chamber only through a bleed tube and enter a lower bleed chamber. A control rod guide insert functions as the floor of the lower bleed chamber. As long as the fluid level float is in its lowest position, DEF bleed fluid can pass from the lower bleed chamber into an upper bleed chamber through an escape port, after which is can flow into the DEF tank via escape apertures in the circumferential wall of the bleed and float body. When fluid level in the DEF tank reaches the fluid level float during a filling operation, the float and the control rod to which it is secured begin to rise. The upper end of the control rod and the upper end of a valve poppet are both rigidly secured to a connector beam. Thus, the valve poppet is also lifted by the rising fluid level float. When the float has risen an amount sufficient for the valve poppet to block the escape port, DEF bleed fluid can no longer enter the bleed circuit. At that point, the biasing spring provides a force sufficient to raise the valve piston to its closed position, thereby raising fluid pressure within the pipe nipple and the receiver fitting. This increase in fluid pressure is sensed by the filling nozzle, which cuts off the flow of fluid into the DEF tank.

The retainer bushing has an upper straight internal female thread, a lower straight female thread, an upper straight external male thread, a pair of equiangularly-spaced external lugs at the bottom end thereof, and a pair of flats machined into the external surface of the retainer bushing that are positioned between the lugs and the straight external male thread. A receiver socket is threadably secured to the upper straight internal female thread of the retainer bushing, and a receiver fitting, to which a DEF supply line can be secured, is threadably installed in the receiver socket. With the receiver socket and the receiver fitting removed from the flow control module assembly, the assembly is inserted into a central aperture in an adapter cap that is secured to the filler neck of the DEF tank. The assembly is axially positioned so that lugs on the retainer bushing fit into opposed slots within the adapter cap. Between the opposed recesses are a pair of locking shelves, each with a stop at one end. When the retainer bushing is rotated 90 degrees in a clockwise direction (viewed from the top of the assembly), each lug moves beneath a locking shelf and against a stop. Once the retainer bushing has been rotated through the 90-degree angle, the lugs become trapped within the slots so that the retainer bushing cannot be lifted along its central axis. Once the retainer bushing has been rotated so that its lugs are positioned within beneath the locking shelves, a locking ring that is internally keyed to non-rotatably fit over a pair of flats of the retainer bushing, and which is also equipped a pair of diametrically-opposed downwardly-projecting tangs, each of which is angularly ramped at one end, is slipped over the top of the retainer bushing. The downwardly-projecting tangs fit into the now-vacant slots in the filler neck. The breather cap is then threadably secured to the external male thread on the retainer bushing, thereby securing the tangs of the locking ring within the slots. The retainer bushing with the attached flow control module can only be removed by unscrewing the collar, rotating the locking ring with a pin wrench, which causes the angularly-ramped tangs of the locking ring to self-eject from the slots so that the retainer bushing and the attached assembly can be removed from the filler neck.

DETAILED DESCRIPTION OF THE INVENTION

Figure 1:
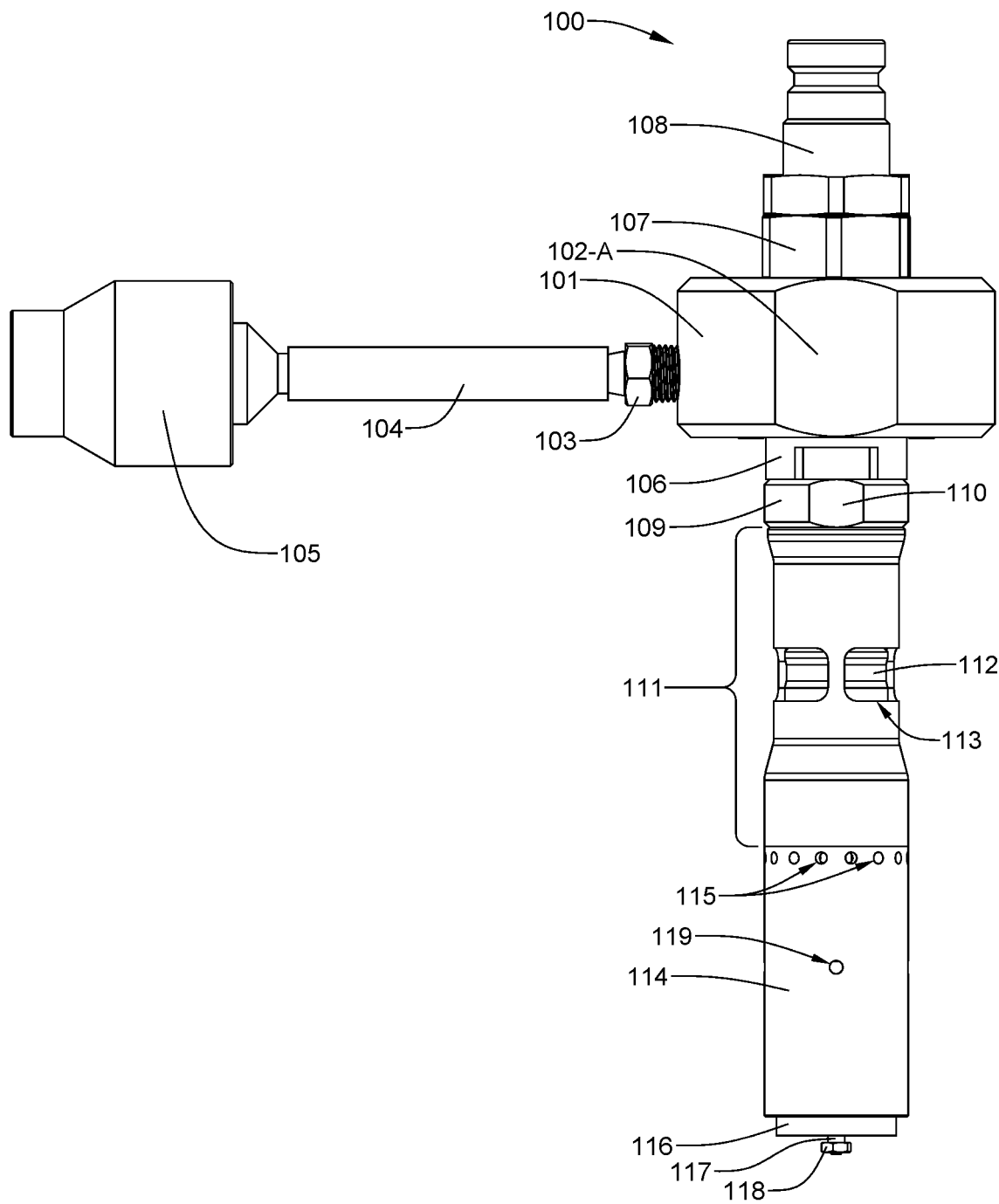
FIG. 1 is a right-side elevational view of the fully-integrated, fluid flow-control module designed for installation within an ISO filler neck of a top-fill DEF tank in a fully-closed configuration, and with a fluid coupler fitting installed at the top thereof.

This invention provides a fully-integrated pressureless flow-control module for top-fill diesel exhaust fluid (DEF) tanks. The module is considered pressureless because a filler nozzle, through which fluid enters the tank, does not cut off fluid flow into the tank in response to the sensing of pressure buildup within the tank. Pressure build up occurs only within the module, and it is this pressure build-up that is sensed by the nozzle and is responsible for the cut-off of fluid flow through the nozzle. The fully-integrated, fluid flow-control module designed for installation within a filler neck of a top-fill diesel exhaust fluid (DEF). The filler neck of the DEF tank conforms to ISO (International Organization for Standardization) Standard 22241-4:2009(E). The new fully-integrated pressureless fluid flow-control module for top-fill diesel exhaust fluid (DEF) tanks will now be described in detail, with reference to the attached drawing figures. It should be understood that although the drawing figures may not be drawn to exact scale, they are, nevertheless, intended to be illustrative of the form and function of the invention.

If the item number comprises three digits, the left-most digit indicates the drawing figure number where the item is most completely visible. Likewise, if the item number comprises four digits, then the two left-most digits indicate the drawing figure where the item is most completely visible.

Figure 2:
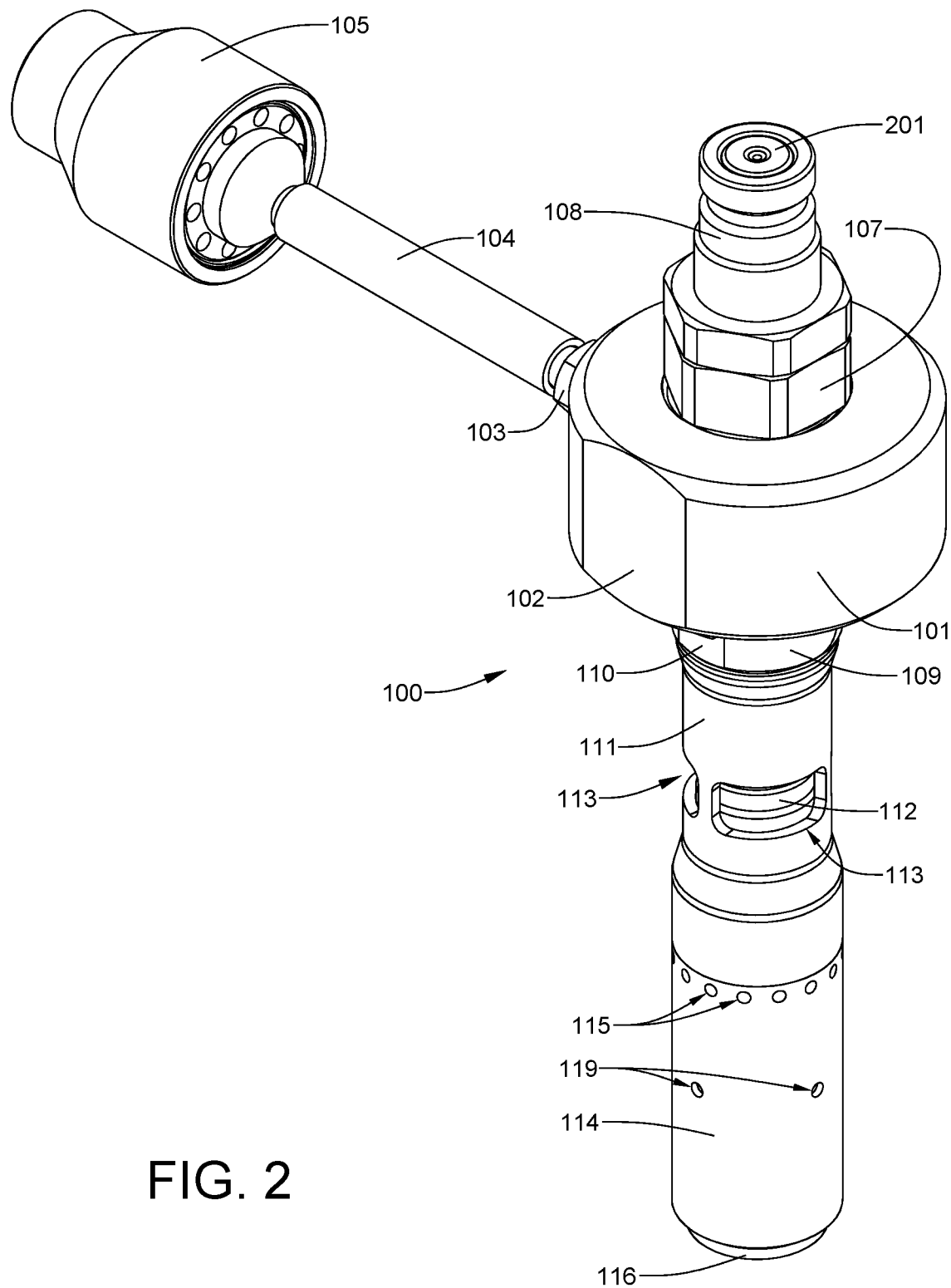
FIG. 2 is an isometric view of the flow-control module of FIG. 1.
Figure 3:
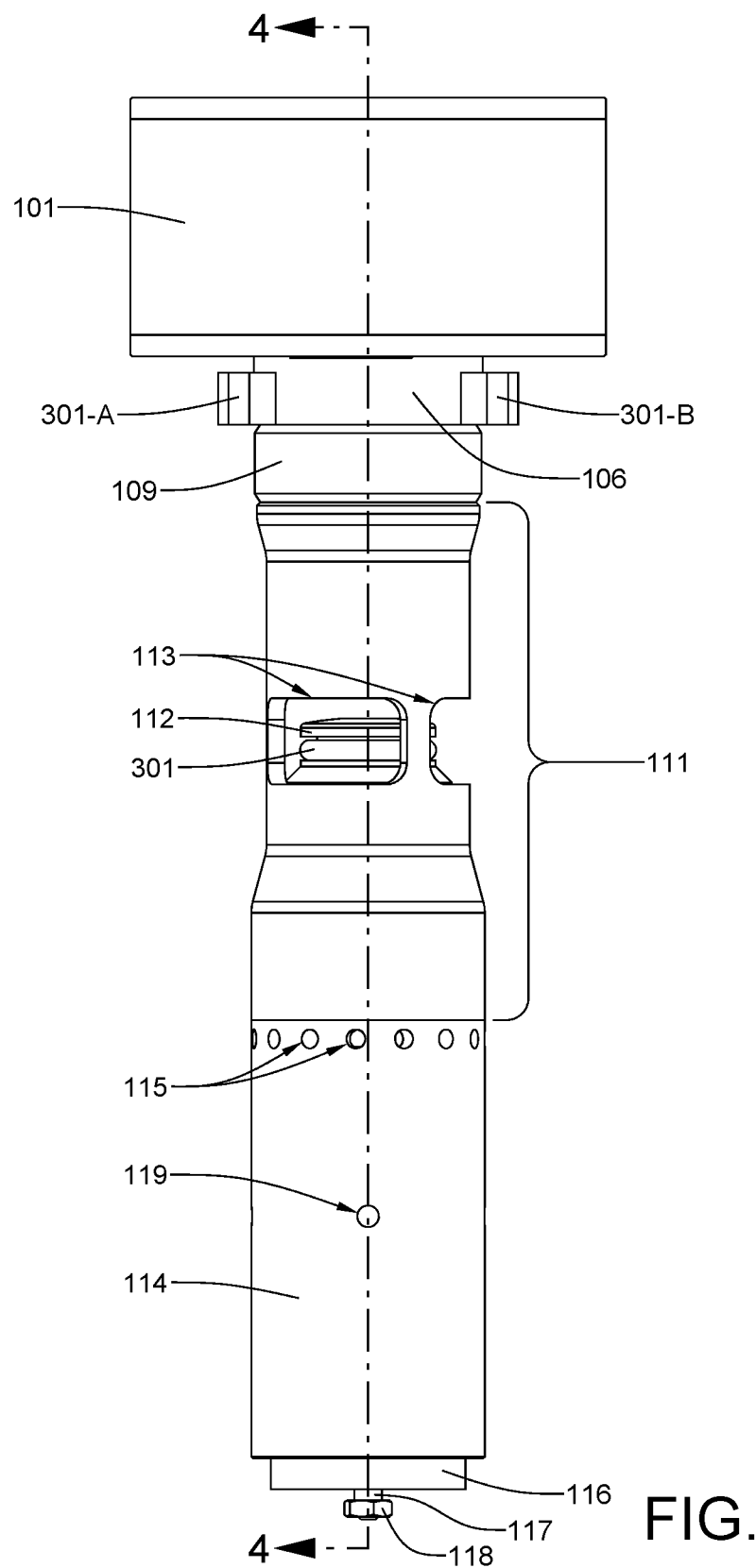
FIG. 3 is a rear elevational view of the flow-control module of FIG. 1, with the fluid coupler fitting removed, in a fully-open configuration.
Figure 5:
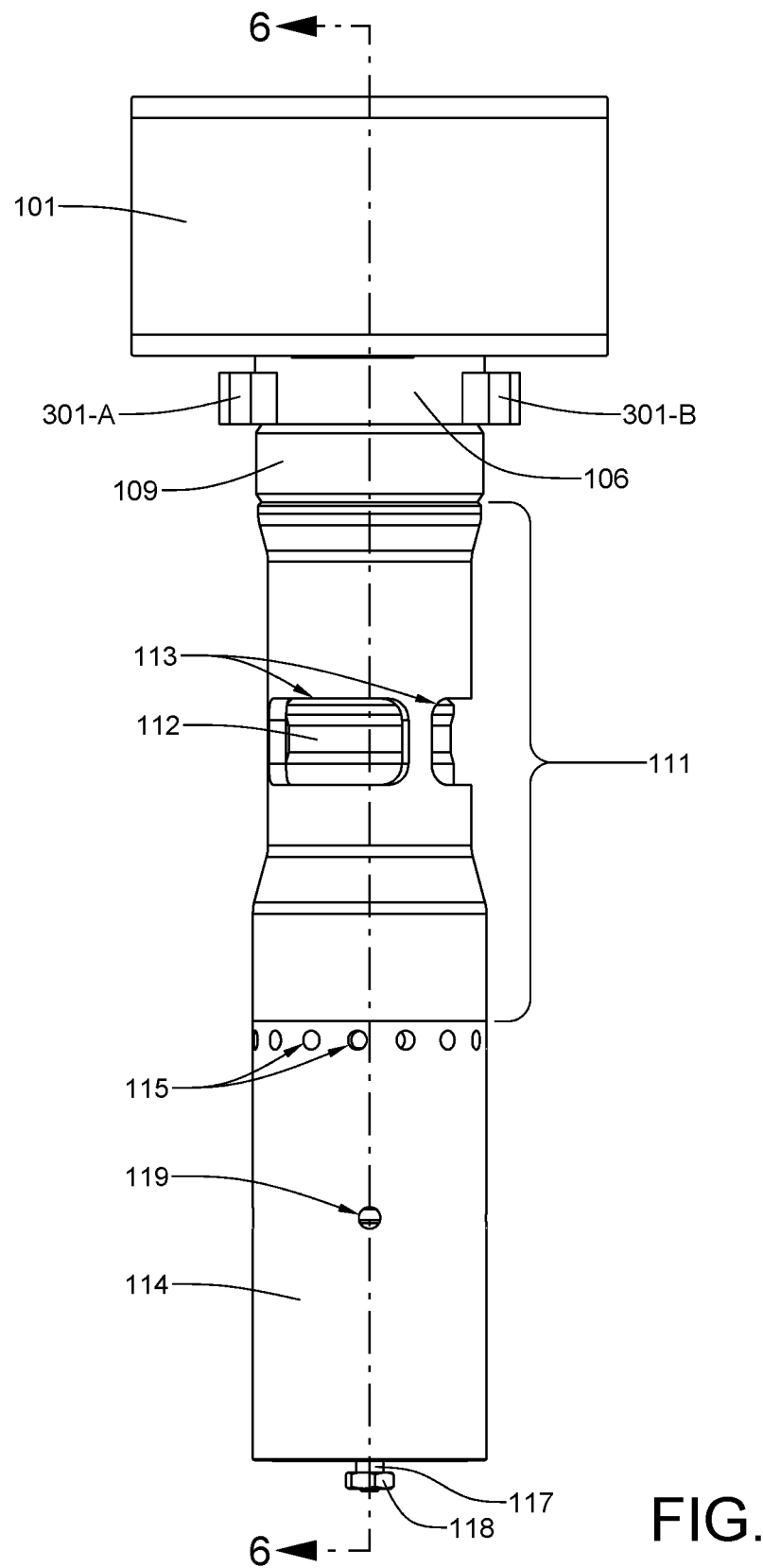
FIG. 5 is a rear elevational view of the flow-control module of FIG. 1, with the fluid coupler fitting removed, in a fully-closed configuration.

Referring now to FIGS. 1, 2, and 3, the flow-control module 100 includes a breather cap 101 that locks the flow-control module 100 within the mouth of the ISO filler neck. The breather cap 101 has a pair of diametrically opposed flats 102-A and 102-B (not visible in this view), thereby enabling the breather cap 101 to be rotated with a spanner wrench. A barbed connector 103 is anchored in a threaded port in the periphery of the breather cap 101, which is in communication with the interior of the breather cap 101. A resilient tube 104 connects the barbed connector 103 to a breather assembly 105, which allows bi-directional flow of air in an out of the DEF tank in which the flow-control module 100 is installed. The breather cap 101 screws onto the externally-threaded top of a retainer bushing 106. A receiver socket 107 screws into the top of the retainer bushing 106, which is also internally threaded. A receiver fitting 108 screws into the receiver socket 107. A pipe nipple 109 couples the retainer bushing 106 to a main valve body 111. Only an annular center flange of the pipe nipple 109 is visible in this view. The center flange is equipped with diametrically opposed flats 110-A and 110-B (not visible in this view) that can also be engaged by a spanner wrench. The main valve body 111 encloses a spring-biased valve piston 112 which opens and closes to control fluid flow into the DEF tank via fill port 113. Movement of the valve piston 112 is controlled by fluid pressure beneath the piston crown, which is, in turn, controlled by a bleed path within a bleed/float body 114 that is secured to the main valve body 111. The bleed/float body 114 is equipped with a plurality of bleed fluid escape ports 115. The bleed path within the bleed/float body 114 is controlled by the position of a fluid level float 116, which is, in turn, is controlled by fluid level in the DEF tank. A plurality of airflow ports 119 in the bleed/float body 114, enables equalization of air pressure within the float chamber as the fluid level float rises within the bleed/float body 114. A threaded nut 118 secures the fluid level float 116 to a central control rod 117. Both the fluid level float 116 and the central control rod move up and down in response to changes in fluid levels within the DEF tank. In FIGS. 1, 2, and 5, the valve piston 112 is in a closed position, while in FIG. 3, the valve piston 112 is in an open position. In FIG. 3, an O-ring seal 301 is installed on the valve piston 112 just below the piston crown. This O-ring seal 301 is used to more completely seal the valve seat and prevent leakage of DEF fluid into the DEF tank when the valve piston 112 is in its closed position. In FIG. 5, it will be noted that the retainer bushing 106 has a pair of opposed lugs 301-A and 301-B, which are employed to lock the flow control module into an adapter cap that is secured to the filler neck of the DEF tank. This will be shown and explained with reference to subsequent drawings.

Figure 4:
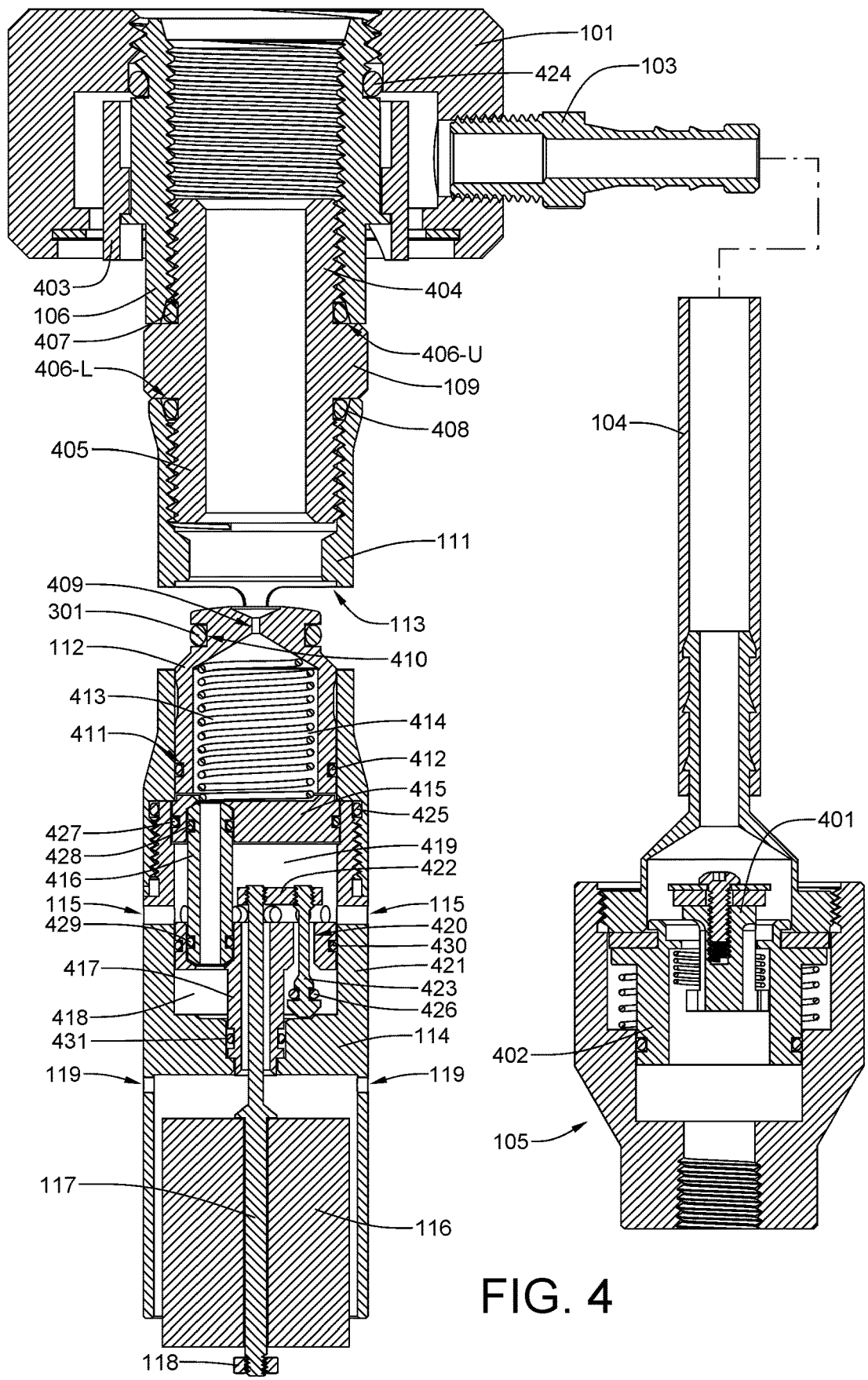
FIG. 4 is a cross-sectional view of the flow-control module of FIG. 3, taken through section line 4-4.
Figure 6:
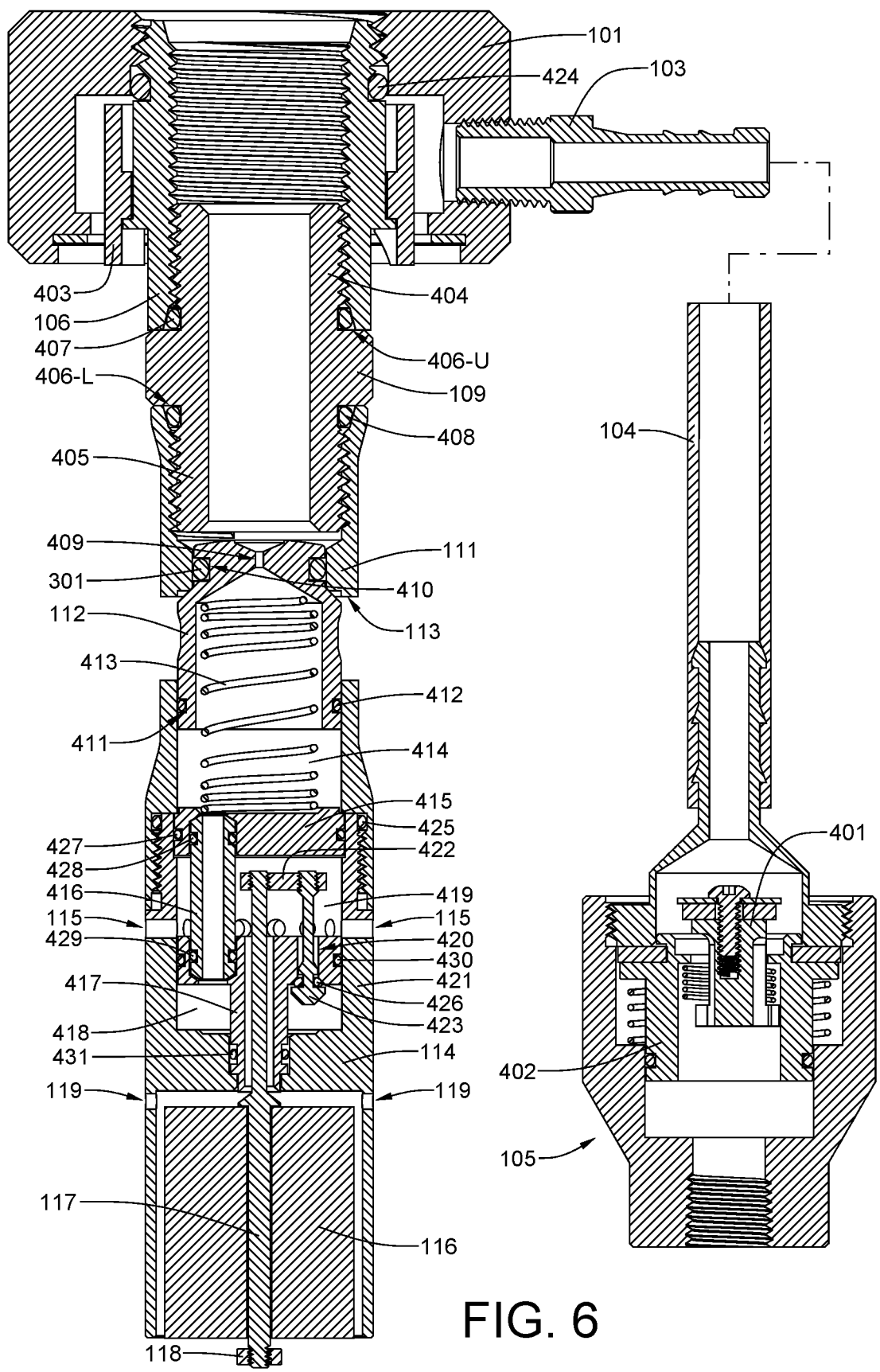
FIG. 6 is a cross-sectional view of the flow-control module of FIG. 1, taken through section line 6-6 of FIG. 5.

Referring now to the cross-sectional view of FIGS. 4 and 6, the function of the internal components of the flow control module 100 will described. As previously mentioned, the breather assembly 105 provides for bidirectional air flow into and out of the DEF tank. As the DEF tank is being emptied and pressure within the tank is less than ambient air pressure, a spring-loaded poppet 401 opens to nearly equalize those pressures. On the other hand, when the tank is being filled, and pressure within the tank is greater than ambient air pressure, a spring-loaded breather piston 402 opens so that the two pressures can nearly equalize. The spring loading on both the poppet 401 and the breather piston 402 prevents absolute equalization of internal and external air pressures.

Still referring to FIGS. 4 and 6, a locking ring 403, used to lock the flow control module within the adapter cap, is visible. It function will be explained with reference to subsequent drawings. In these cross-sectional views, it can be seen that the retainer bushing 106 screws onto an upper portion 404 of the pipe nipple 109, and the top of the main valve body 109 screws onto a bottom portion 405 of the pipe nipple 109. It will be noted that the center flange of the pipe nipple 109 has an upper annular surface 406-U that provides a sealing surface for upper O-ring seal 407 and a lower annular surface 406-L that provides a sealing surface for lower O-ring seal 408. The use of O-ring seals negates the need for tapered threads on the threaded joints. It will be noted that the valve piston 112 incorporates an O-ring groove 410, in which the piston O-ring 301 is installed. The valve piston 112 also has a skirt O-ring groove 411 and a skirt O-ring seal 412 installed within O-ring groove 411. The skirt O-ring seal 411 prevents DEF fluid from leaking around the piston skirt an into the bleed circuit. Thus bleed fluid can enter the bleed circuit only through the bleed aperture 409 that is in the center of the piston crown. Until fluid level in the DEF tank has reached the level of the fluid level float 116, the valve piston 112 is in the lowered position, and DEF fluid can enter the DEF tank through fill ports 113 and enter the bleed circuit through the bleed aperture 409. As long as DEF bleed fluid can pass through the bleed aperture 409, the biasing spring 413 provides a biasing force that is insufficient to raise the valve piston 112 to its closed position. Bleed fluid enters the biasing spring chamber 414 beneath the bleed aperture 409. A partition 415 provides a floor for the biasing spring chamber 414, and enables bleed fluid to escape from the chamber 414 and enter a lower bleed chamber 418 only through a bleed tube 416. A control rod guide insert 417 functions as the floor of the lower bleed chamber 418. It will be noted that the bleed tube 416 is sandwiched between the partition 415 and the guide insert 417. As long as the fluid level float is in its lowest position, as shown in FIG. 4, DEF bleed fluid can pass from the lower bleed chamber 418 into an upper bleed chamber 419 through an escape port 420, and then into the DEF tank through the bleed fluid escape apertures 115 in the circumferential wall 421 of the bleed/float body 114. When fluid level in the DEF tank reaches the fluid level float 116, the float 116 begins to rise, lifting the control rod 117 and the connector beam 422. A valve poppet 423 is secured to the connector beam 422, and it also is lifted by the rising fluid level float 116. When the float 116 has risen an amount sufficient for the valve poppet 423 to block the escape port 420, DEF bleed fluid can no longer enter the bleed circuit. At that point, fluid pressure beneath the valve piston 112 increases to a level that the biasing spring 413 provides a force sufficient to raise the valve piston 112 to its closed position, thereby raising fluid pressure within the pipe nipple 109 and the receiver fitting 108. This increase in fluid pressure is sensed by the filling nozzle, which cuts off the flow of fluid into the DEF tank. In FIG. 6, the fluid level float 116 has risen, thereby causing the control rod 117, the connector beam 422 and the valve poppet 423 to rise and block the escape port 420. The valve piston 112 has closed in response to the sealing of the escape port 420.

Still referring to FIGS. 4 and 6, it will be noted that O-ring seals are used extensively to seal joints. O-ring seal 424 is used to seal the vent cap 101 to the retainer bushing 106, O-ring seal 425 is used to seal the joint between the main valve body 111 and the bleed/float body 114. O-ring seal 426 is used on the valve poppet 423 to completely seal the escape port 420 when the valve poppet 423 is in its elevated and closed position. O-ring seals 427, 428, 429, 430 and 431 are used to seal joints in the fluid bleed circuit.

Figure 7:
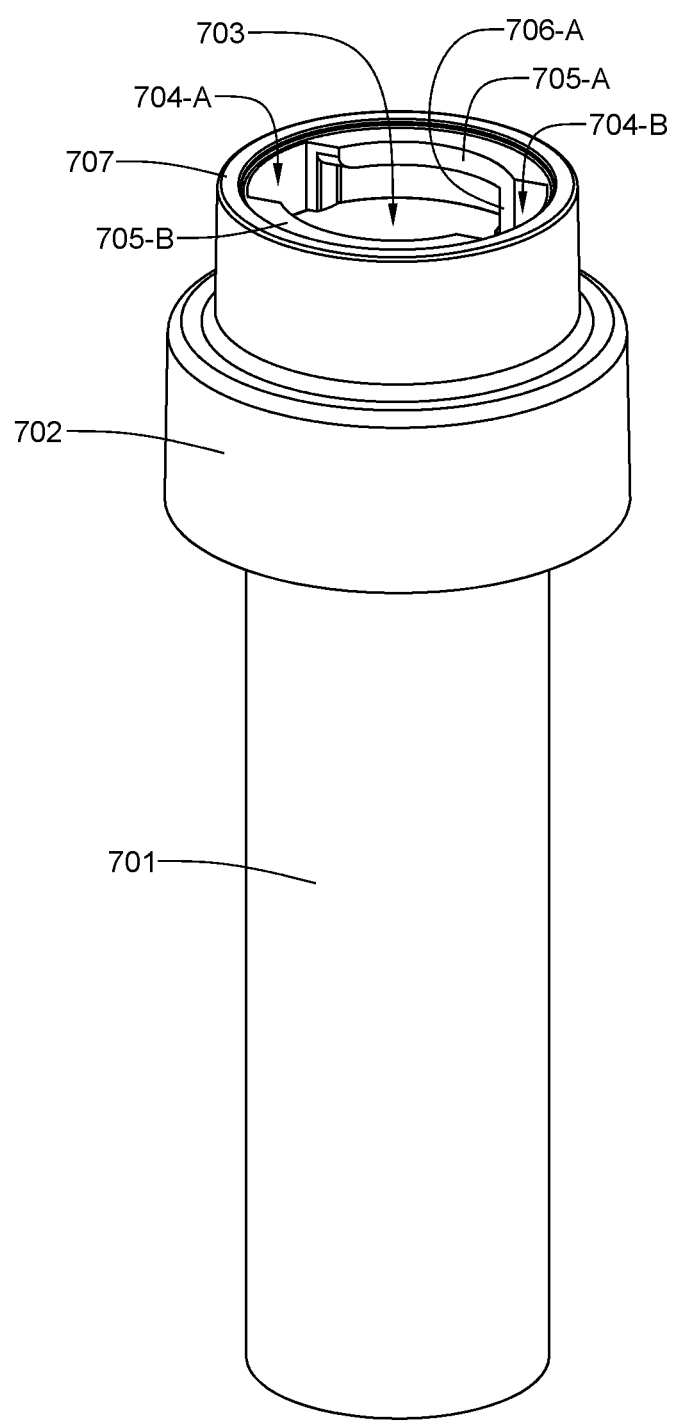
FIG. 7 is an isometric view of an adapter cap and of a wave damping sleeve, which is held in place by the adapter cap when it is screwed onto the external threads of an ISO filler neck of a DEF tank.

Referring now to FIG. 7, an adapter cap 702 having internal threads that are designed to threadably engage the external threads of a DEF tank filler neck conforming to ISO Standard 22241-4:2009(E), is shown. A lower portion of the flow-control module 100 fits within a wave damping sleeve 701 that will be secured to the ISO filler neck by the adapter cap 702. The adapter cap 702 has a central aperture 703. The adapter cap 702 is equipped with a pair of opposed slots 704-A and 704-B. Between the opposed slots 704-A and 704-B are a pair of locking shelves 705-A and 705-B, each with a stop at one end (only stop 706-A is visible in this view; stop 706-B, which is identical to stop 706-A, is hidden).

Figure 8:
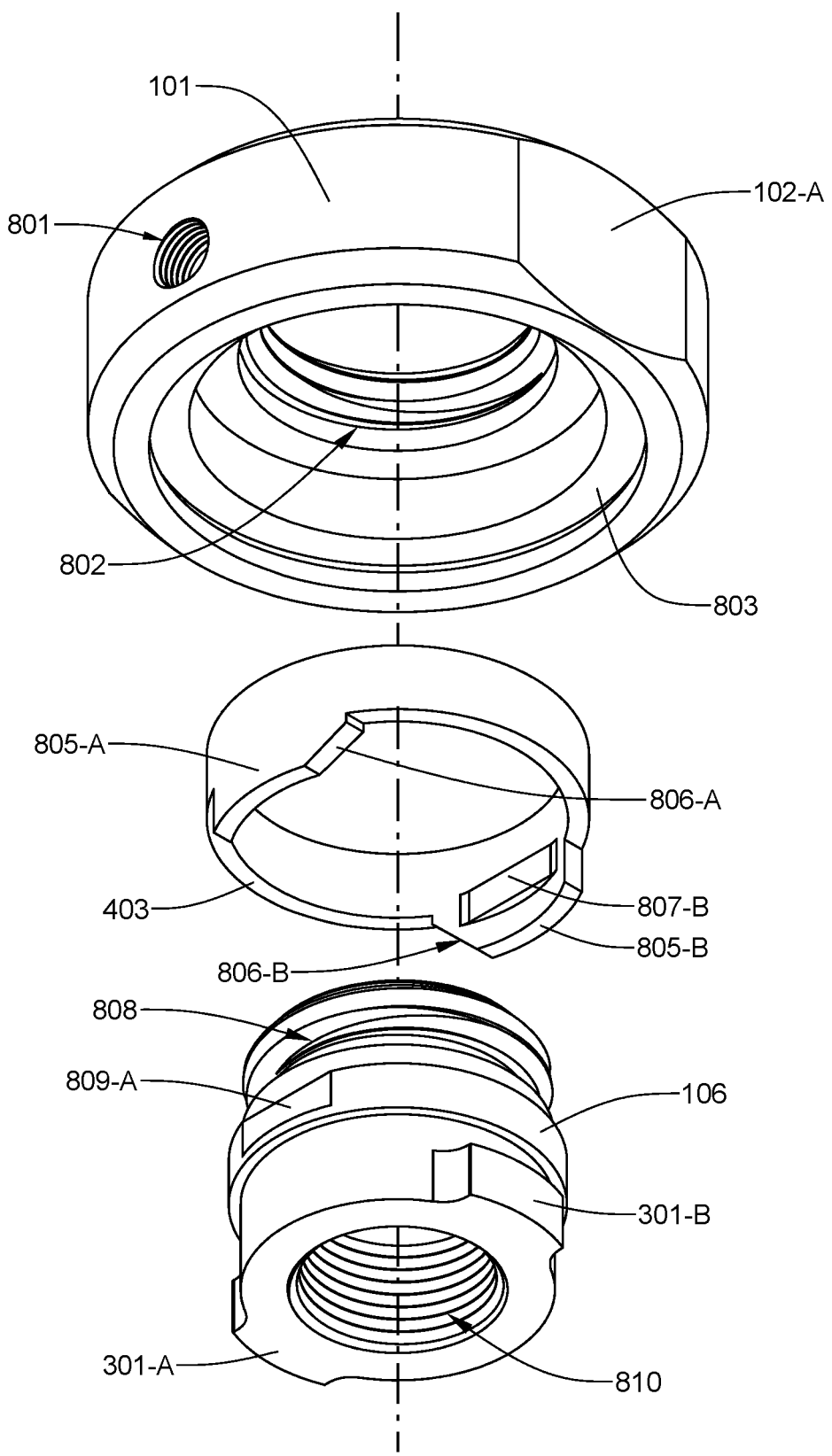
FIG. 8 is an exploded isometric view of the collar, the locking ring and the retainer bushing.

Referring now to FIG. 8, only the breather cap 101, the locking ring 403 and the retainer bushing 106 are shown in this view. It will be noted that the retainer bushing 106 has a pair of opposed lugs 301-A and 301-B. With the receiver socket 107, the receiver fitting 108, the breather cap 101 and the barbed connector 103, the resilient tube 104 and the breather assembly 105 removed from the assembly of FIGS. 1 through 6, the flow-control module is inserted, float end first, into the central aperture 703 of the adapter cap 702 which will be threadably secured to the filler neck of the DEF tank (shown in FIGS. 13 and 14). The assembly is axially positioned so that the lugs 301-A and 301-B on the retainer bushing 106 fit into opposed slots 704-A and 704-B within the adapter cap 702. When the assembly is rotated 90 degrees in a clockwise direction (viewed from the top of the assembly), each lug 301-A and 301-B moves beneath a locking shelf 705-A and 705-B, respectively, and against a stop 706-A and 706-B, respectively. Before insertion of the assembly into the central aperture 703 of the adapter cap 702, the assembly can be rotated 180 degrees so that lugs 301-A and 301-B engage opposed slots 704-B and 704-A, respectively. In other words, either orientation of the assembly works equally well. Once the retainer bushing 106 has been rotated through the 90-degree angle, the lugs 301-A and 301-B become trapped within the locking shelves 705-A and 705-B so that the retainer bushing and the flow-control module assembly to which it is attached, can no longer be lifted out of the adapter cap 702. Once the flow-control module assembly has been rotated so that its lugs 301-A and 301-B are positioned against the stops 706-A and 706-B, the locking ring 403 which is equipped with internal keys 807-A and 807-B, that non-rotatably fit over flats 809-A and 809-B, respectively, of the retainer bushing 106, and which is also equipped a pair of diametrically-opposed downwardly-projecting tangs 805-A and 805-B, each of which has an angular ramp 806-A and 806-B, respectively, at one end thereof, is slipped over the top of the retainer bushing 106. The downwardly-projecting tangs 805-A and 805-B fit into the now-vacant slots 704-A and 704-B in the adapter cap 702. The breather cap 101 and O-ring seal 424 are then slipped over the retainer bushing 106 and the internal female thread 802 of the breather cap 101 is threaded onto the straight external male thread 808 of the retainer bushing 106, thereby securing the tangs 805-A and 805-B of the locking ring 403 within the slots 704-A and 704-B. It will be noted that an inner annular downward facing surface 803 of the breather cap 101 presses against an upper circumferential lip 707 of the adapter cap 702. The retainer bushing 106 with the attached flow control module can be removed by unscrewing the breather cap 101, which causes the locking ring 403 to rotate counterclockwise and self-eject from the slots 704-A and 704-B as each of the angularly-ramped tangs 805-A and 805-B contacts a corner of one of the stops 706-A or 706-B, thereby enabling the retainer bushing 106 and the flow-control module to which it is secured, to be removed from the adapter cap 702.

Figure 9:
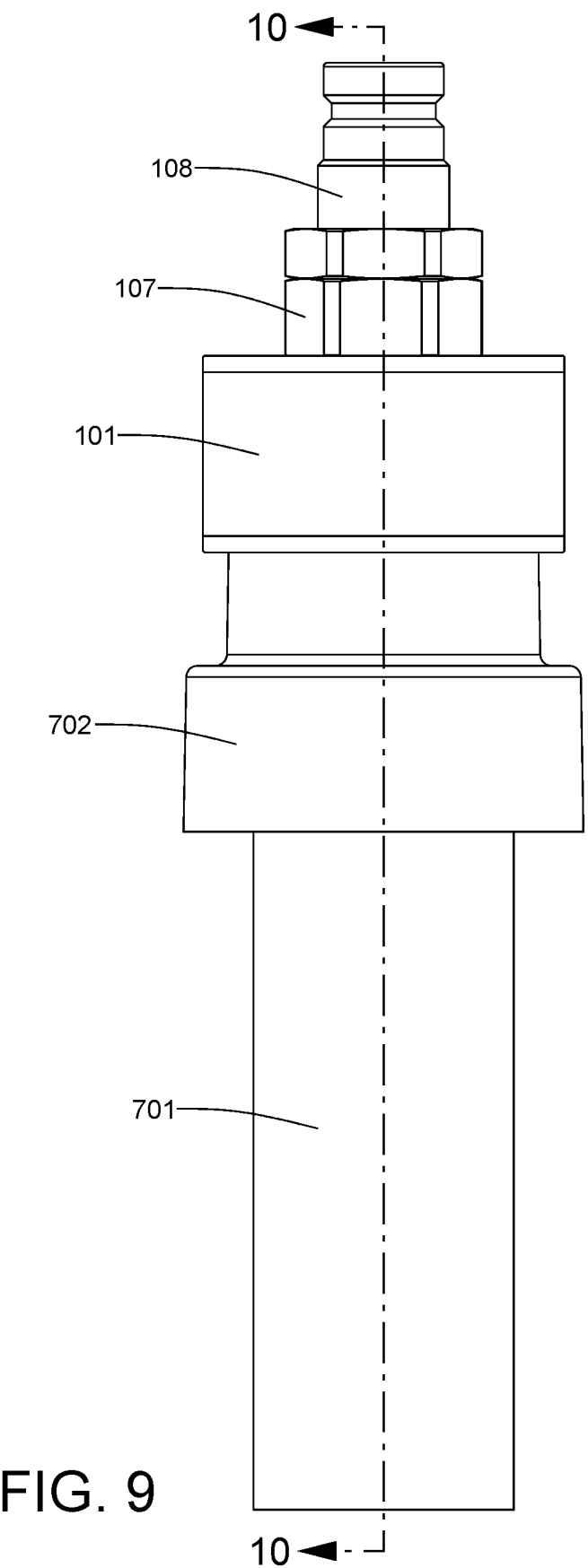
FIG. 9 is a rear elevational view of the flow control module of FIG. 1, installed within the wave damping sleeve and secured to the adapter cap which screws onto the external threads of an ISO filler neck of a DEF tank.

Referring now to FIG. 9, a lower portion of the flow-control module 100 has been installed within a wave damping sleeve 701, which will be secured to the ISO filler neck of the DEF tank by the adapter cap 702. The flow-control module 100 is secured to the adapter cap 702.

Figures 10, 11:
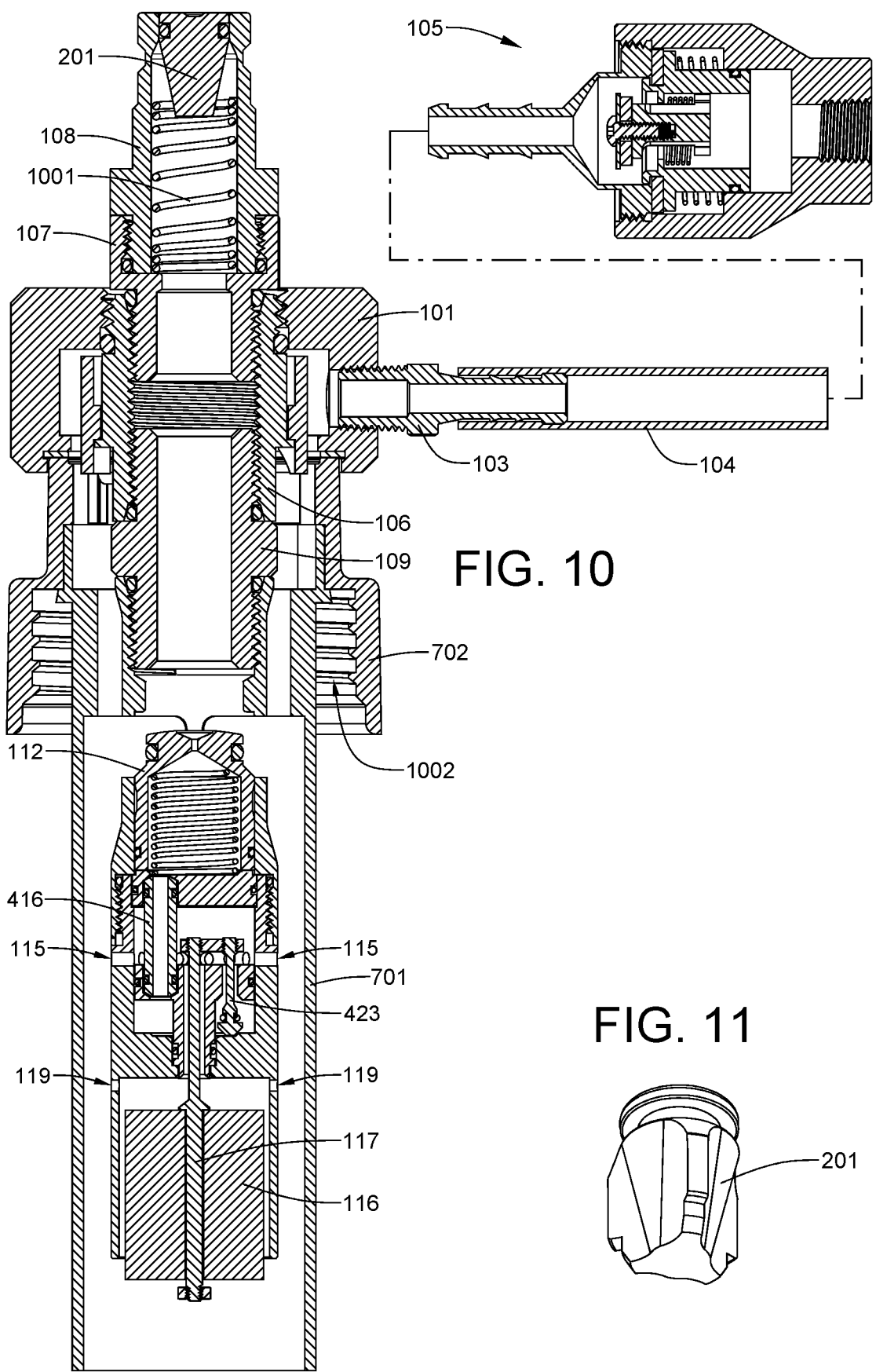
FIG. 10 is a cross-sectional view of the assembly of FIG. 9, taken through section line 10-10 of FIG. 9, in a fully-open configuration.
FIG. 11 is an isometric view of the valve plunger installed within the receiver fitting, the top of which was visible in FIG. 2.

Referring now to FIG. 10, this cross-sectional view of the installed flow-control module 100 shows both the valve piston 112 and the valve poppet 423 in fully-open positions. It will be noted that a valve plunger 201 within the receiver fitting 108 is urged to a closed configuration by a biasing spring 1001. The internal threads 1002 of the adapter cap 702 are visible in this view.

Referring now to FIG. 11, an isometric view of the valve plunger 201 installed within the receiver fitting shows how fluid can flow around it when it is in an open configuration.

Figure 12:
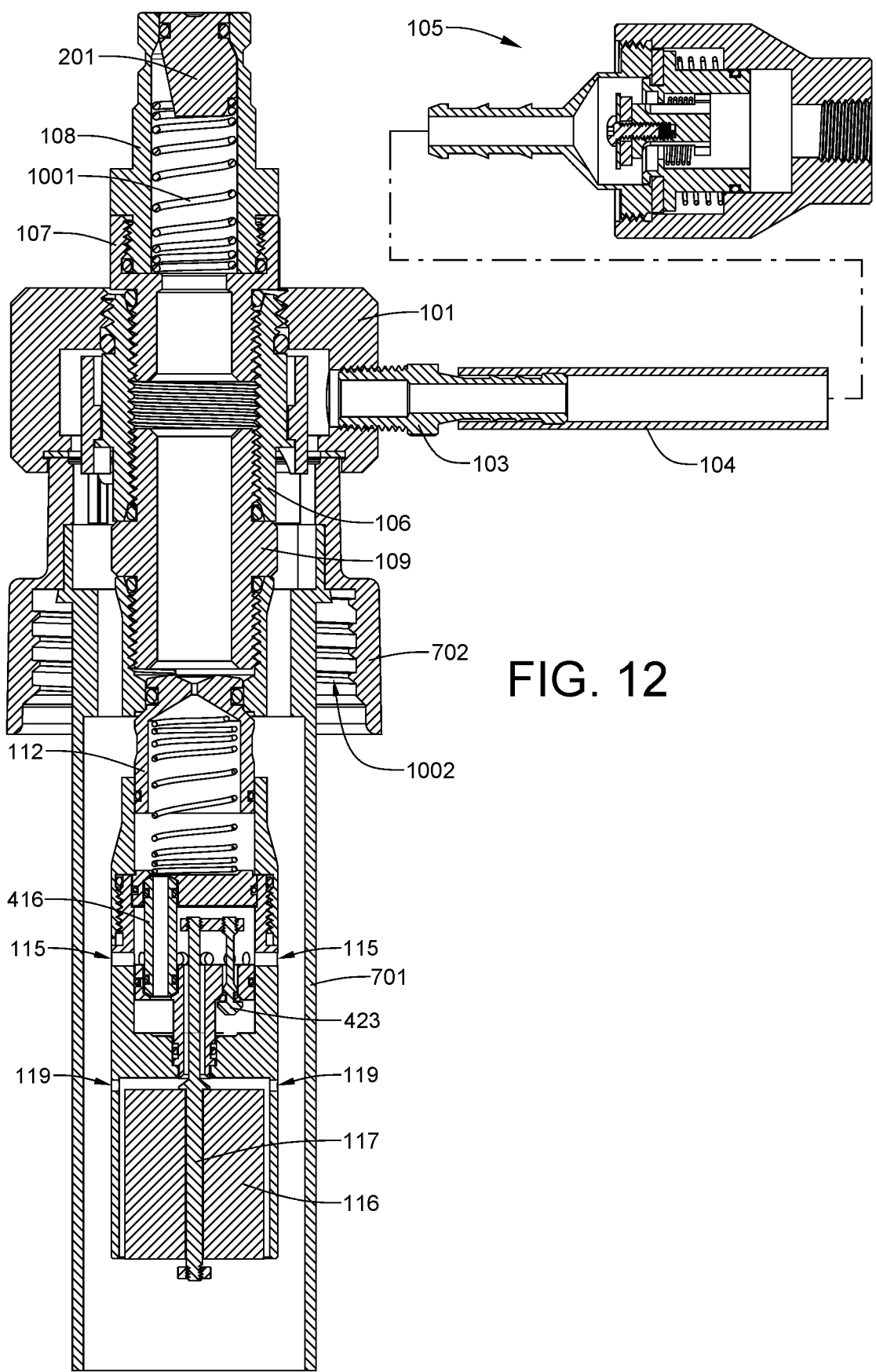
FIG. 12 is a cross-sectional view of the flow control module of FIG. 1, in a fully-closed configuration, secured to an adapter cap and installed within a wave damping sleeve.

Referring now to FIG. 12, this cross-sectional view of the installed flow-control module 100 is identical to that of FIG. 10, but with both the valve piston 112 and the valve poppet 423 in fully-closed positions.

Figure 13:
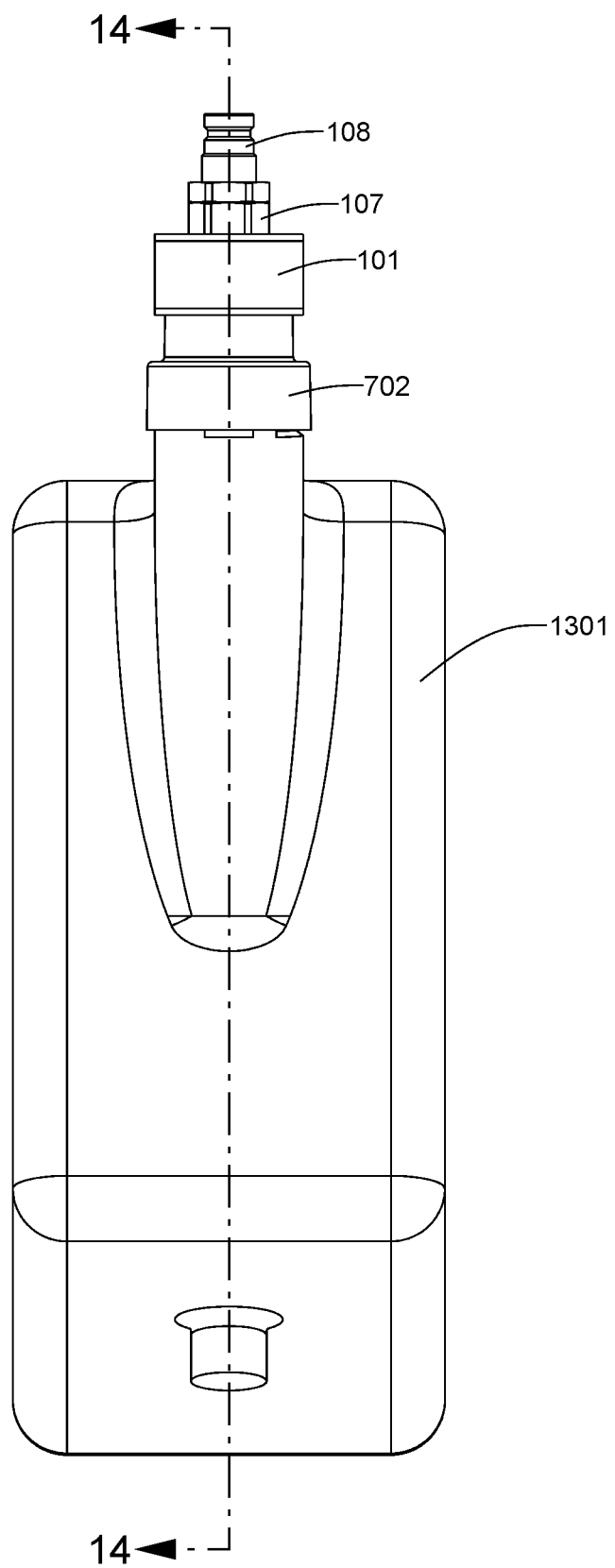
FIG. 13 is an elevational view of a top-fill DEF tank having an ISO filler neck, with the adapter cap threadably secured to the ISO filler neck and the flow-control module secured to the adapter cap.

Referring now to FIG. 13, the flow-control module 100 is shown installed in the ISO filler neck of a DEF tank 1301.

Figure 14:
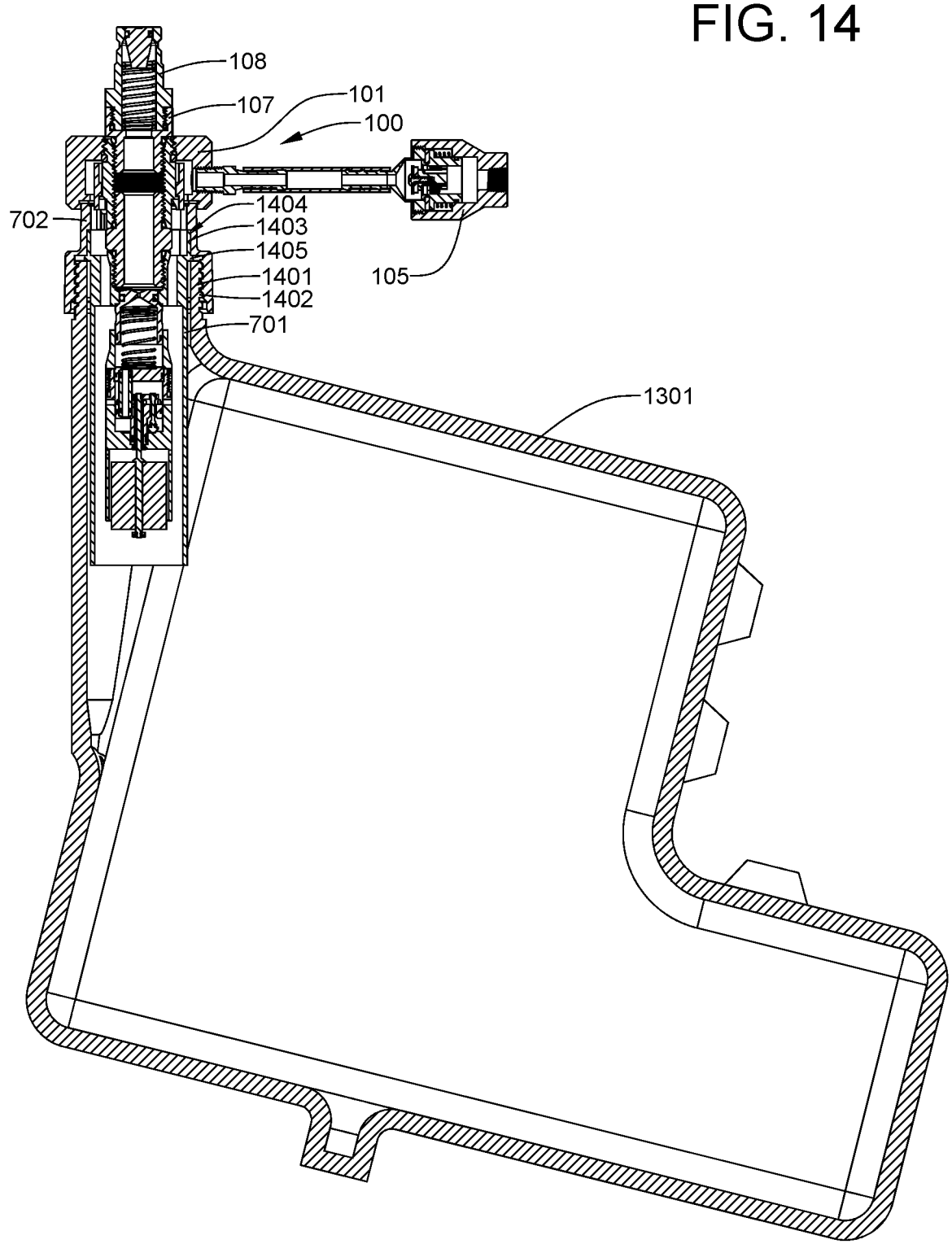
FIG. 14 is a cross-sectional view of the assembly of FIG. 10, taken through section line 14-14 of FIG. 13.

Referring now to FIG. 14, this cross-sectional view shows the flow-control module 100 as installed within the ISO filler neck 1401 of the DEF tank 1301. The adapter cap 702 is designed with internal threads 1002 that engage the external threads 1402 of the DEF tank filler neck 1401. The wave damping sleeve 701, which mitigates the effects of the sloshing of DEF fluid within the tank 1300, slides into the ISO filler neck 1401. A lower portion of the flow-control module 100 fits within the wave damping sleeve 701, which has a cylindrical upper extension 1403 that fits within a cylindrical recess 1404 in the adapter cap 702. An annular flange 1405 near the top of the wave damping sleeve 701 rests on the top of the filler neck 1401. The adapter cap 702, when threaded onto the filler neck external threads 1402, compresses the annular flange 1405 between the mouth of the filler neck 1401 and the adapter cap 702.

Although only a single embodiment of the invention is shown and described herein, it will be obvious to those having ordinary skill in the art that changes and modifications may be made thereto without departing from the scope and the spirit of the invention as hereinafter claimed.

What is claimed is:

1. A fully-integrated flow-control module which fits within an externally-threaded filler neck of a DEF tank, said flow-control module comprising:
   an adapter cap having internal threads that engage the externally-threaded filler neck of the DEF tank;
   a breather cap having a central fluid flow path, said breather cap equipped with a breather assembly, said breather assembly providing both a normally closed spring-loaded poppet that admits air into the DEF tank as it is emptied, and a spring-loaded breather piston that allows air to escape the DEF tank as it is filled;
   a receiver fitting coupled to an upper end of the breather cap, said receiver fitting being couplable to a dry-break DEF filler nozzle;
   a main valve body coupled to a lower end of the breather cap;

a spring-biased valve piston installed within the main valve body so that it can slide both upwardly and downwardly therein, slidable movement of said valve piston being controlled by fluid pressure beneath the piston crown, said fluid pressure being controlled by fluid flow through a bleed path that begins through a bleed aperture in a center of the piston crown, said valve piston operating to open and close a fill port through which fluid enters the DEF tank;

a bleed/float body coupled to a lower end of the main valve body, said bleed/float body incorporating a majority of the bleed path;

a fluid level float secured to a control rod and vertically slidable within a chamber a bottom end of said bleed/float body;

a bleed valve poppet that controls fluid flow through the bleed path; and a connector beam to which both the control rod and the bleed valve poppet are rigidly secured;

wherein a rise of fluid level within the DEF tank causes the fluid level float to rise, thereby lifting the connector beam and bleed valve poppet such that the bleed valve poppet seals a bleed circuit escape port, thereby enabling the valve piston to close, which causes an increase in fluid pressure at a dry-break filler nozzle attached to the receiver fitting, and thereby causing the nozzle to shut off fluid flow therethrough.

2. The fully-integrated flow-control module of claim 1, wherein the bleed fluid passes through the bleed aperture in the piston crown, enters a biasing spring chamber, passes through a bleed tube to a lower bleed chamber, passes through a escape port that is blockable by the bleed valve poppet, enters an upper bleed chamber, and finally passes through fluid escape ports into the DEF tank.

3. The fully-integrated flow-control module of claim 1, wherein at least one O-ring is employed to minimize fluid leakage around the valve piston.

4. The fully-integrated flow-control module of claim 1, wherein an O-ring seal is used on the valve poppet to minimize bleed fluid leakage through the escape port when the valve poppet is in its elevated, closed position.

5. The fully-integrated flow-control module of claim 1, which further comprises:

a retainer bushing to which the breather cap is securable, said retainer bushing having a pair of opposed lugs which fit into a pair of opposed slots within the adapter cap, said opposed slots being positioned between a pair of locking shelves, each locking shelf having a stop at one end thereof, said retainer bushing being rotatable 90 degrees in a clockwise direction to locate the lugs move beneath the locking shelves until they contact the stops at the end of the locking shelves; and a locking ring having downwardly-projecting tangs that fit into the opposed slots after the retainer bushing has been rotated clockwise 90 degrees, thereby preventing the retainer bushing from being removed from the adapter cap after the breather cap is fully threadably secured to the retainer bushing.

6. The fully-integrated flow-control module of claim 1, wherein the retainer bushing can only be removed from the adapter cap by unscrewing the breather cap from the retainer bushing.

7. A fully-integrated flow-control module which fits within an externally-threaded filler neck of a DEF tank, said flow-control module comprising:

an adapter cap having internal threads that engage the externally-threaded filler neck of the DEF tank, said adapter cap being equipped with a pair of opposed slots which are positioned between a pair of locking shelves, each locking having a stop at one end thereof;

a retainer bushing having upper and lower internal threads and upper external threads and a pair of opposed lugs which fit into the opposed slots of the adapter cap, and when the retainer bushing is rotated clockwise, the lugs move beneath the locking shelves until they contact the stops at the end of the locking shelves;

a breather cap having internal threads that are securable to the external threads of the retainer bushing;

a receiver socket securable to the upper internal threads of the retainer bushing;

a receiver fitting securable to the receiver socket, said receiver fitting being couplable to a dry-break DEF filler nozzle;

a pipe nipple externally treaded at both ends, an upper end thereof secured to the lower internal threads of the retainer bushing;

a main valve body equipped with upper internal threads that are secured to a lower threaded end of the pipe nipple;

a spring-biased valve piston installed within the main valve body so that it can slide both upwardly and downwardly therein, slidable movement of said valve piston being controlled by fluid pressure beneath the piston crown, said fluid pressure being controlled by fluid flow through a bleed path that begins through a bleed aperture in a center of the piston crown, said valve piston operating to open and close a fill port through which fluid enters the DEF tank;

a bleed/float body, an upper end of which is secured to a lower end of the main valve body, said bleed/float body incorporating a majority of the bleed path;

a fluid level float secured to a control rod and vertically slidable within a chamber at a bottom end of said bleed/float body;

a bleed valve poppet that controls fluid flow through the bleed path; and a connector beam to which both the control rod and the bleed valve poppet are rigidly secured;

wherein a rise of fluid level within the DEF tank causes the fluid level float to rise, thereby lifting the connector beam and bleed valve poppet such that the bleed valve poppet seals a bleed circuit escape port, thereby enabling the valve piston to close, which causes an increase in fluid pressure at a dry-break filler nozzle attached to the receiver fitting, and thereby causing the nozzle to shut off fluid flow therethrough.

8. The fully-integrated flow-control module of claim 7, which further comprises a breather assembly secured to the breather cap, said breather assembly providing both a normally closed spring-loaded poppet that admits air into the DEF tank as it is emptied, and a spring-loaded breather piston that allows air to escape the DEF tank as it is filled.

9. The fully-integrated flow-control module of claim 7, wherein the bleed fluid passes through the bleed aperture in the piston crown, enters the biasing spring chamber, passes through a bleed tube to a lower bleed chamber, passes through a escape port that is blockable by the bleed valve poppet, enters an upper bleed chamber, and finally passes through fluid escape ports into the DEF tank.

10. The fully-integrated flow-control module of claim 7, wherein at least one O-ring is employed to minimize fluid leakage around the valve piston.

11. The fully-integrated flow-control module of claim 7, wherein an O-ring seal is used on the valve poppet to minimize bleed fluid leakage through the escape port when the valve poppet is in its elevated, closed position.

12. The fully-integrated flow-control module of claim 7, which further comprises a locking ring having downwardly-projecting tangs that fit into the opposed slots after the retainer bushing has been rotated clockwise 90 degrees, thereby preventing the retainer bushing from being removed from the adapter cap after the breather cap is fully threadably secured to the retainer bushing.

13. The fully-integrated flow-control module of claim 7, wherein the retainer bushing can only be removed from the adapter cap by unscrewing the breather cap from the retainer bushing.

14. A fully-integrated flow-control module which fits within an externally-threaded filler neck of a DEF tank, said flow-control module comprising:
- an adapter cap having internal threads that engage the externally-threaded filler neck of the DEF tank;
- a retainer bushing having upper and lower ends, said lower end being lockably couplable to the adapter cap;
- a breather cap securable to the upper end of the retainer bushing;
- a receiver socket also securable to the upper end of the retainer bushing;
- a receiver fitting secured to the receiver socket, said receiver fitting being couplable to a dry-break DEF filler nozzle;
- a pipe nipple having upper and lower ends, said upper end thereof being secured to the lower end of the retainer bushing;
- a main valve body having an upper end secured to the lower end of the pipe nipple;
- a spring-biased valve piston installed within the main valve body so that it can slide both upwardly and downwardly therein, slidable movement of said valve piston being controlled by fluid pressure beneath the piston crown, said fluid pressure being controlled by fluid flow through a bleed path that begins through a bleed aperture in a center of the piston crown, said valve piston operating to open and close a fill port through which fluid enters the DEF tank;
- a bleed/float body, an upper end of which is secured to a lower end of the main valve body, said bleed/float body incorporating a majority of the bleed path;
- a fluid level float secured to a control rod and vertically slidable within a chamber at a bottom end of said bleed/float body;
- a bleed valve poppet that controls fluid flow through the bleed path; and
- a connector beam to which both the control rod and the bleed valve poppet are rigidly secured;
- wherein a rise of fluid level within the DEF tank causes the fluid level float to rise, thereby lifting the connector beam and bleed valve poppet such that the bleed valve poppet seals a bleed circuit escape port, thereby enabling the valve piston to close, which causes an increase in fluid pressure at a dry-break filler nozzle attached to the receiver fitting, and thereby causing the nozzle to shut off fluid flow therethrough.

15. The fully-integrated flow-control module of claim 14, which further comprises a breather assembly secured to the breather cap, said breather assembly providing both a normally closed spring-loaded poppet that admits air into the DEF tank as it is emptied, and a spring-loaded breather piston that allows air to escape the DEF tank as it is filled.

16. The fully-integrated flow-control module of claim 14, wherein the bleed fluid passes through the bleed aperture in the piston crown, enters the biasing spring chamber, passes through a bleed tube to a lower bleed chamber, passes through a escape port that is blockable by the bleed valve poppet, enters an upper bleed chamber, and finally passes through fluid escape ports into the DEF tank.

17. The fully-integrated flow-control module of claim 14, wherein at least one O-ring is employed to minimize fluid leakage around the valve piston.

18. The fully-integrated flow-control module of claim 14, wherein an O-ring seal is used on the valve poppet to minimize bleed fluid leakage through the escape port when the valve poppet is in its elevated, closed position.

19. The fully-integrated flow-control module of claim 14, which further comprises a locking ring having downwardly-projecting tangs that fit into a pair of opposed slots in the adapter cap after the retainer bushing, which has a pair of opposed lugs—which fit into the opposed slots, has been rotated clockwise 90 degrees, thereby preventing the retainer bushing from being removed from the adapter cap after the breather cap is fully threadably secured to the retainer bushing.

20. The fully-integrated flow-control module of claim 14, wherein the retainer bushing can only be removed from the adapter cap by unscrewing the breather cap from the retainer bushing.

\* \* \* \* \*